Oct. 14, 1930.　　　A. C. WHITE　　　1,778,053

SAW DE-PITCHING MACHINE

Filed June 10, 1929

INVENTOR,
A. C. White,
BY
F. E. Maynard, ATTORNEY.

Patented Oct. 14, 1930

1,778,053

UNITED STATES PATENT OFFICE

AUDLEY C. WHITE, OF FRESNO, CALIFORNIA

SAW-DEPITCHING MACHINE

Application filed June 10, 1929. Serial No. 369,811.

This invention relates to band saw machinery and more particularly to means for de-pitching the bands of saws while they are in place and are operating.

It is an object of the present invention to provide a simple, practicable and efficient machine adapted to be readily installed in combination with band saw machines so as to operate on the surfaces of the saw to clean it and especially to remove pitch and which accumulates during use in sawing operations.

A further object of the invention is to provide for the protection of the toothed edge of the saw against injury by the de-pitching apparatus.

Additional objects, advantages and features of construction and combination will be made manifest in the ensuing description of the herewith illustrative embodiment; it being understood that modification, adaptations, and variations may be resorted within the spirit, scope and principle of the invention as it is more directly claimed hereinafter.

Figure 1:
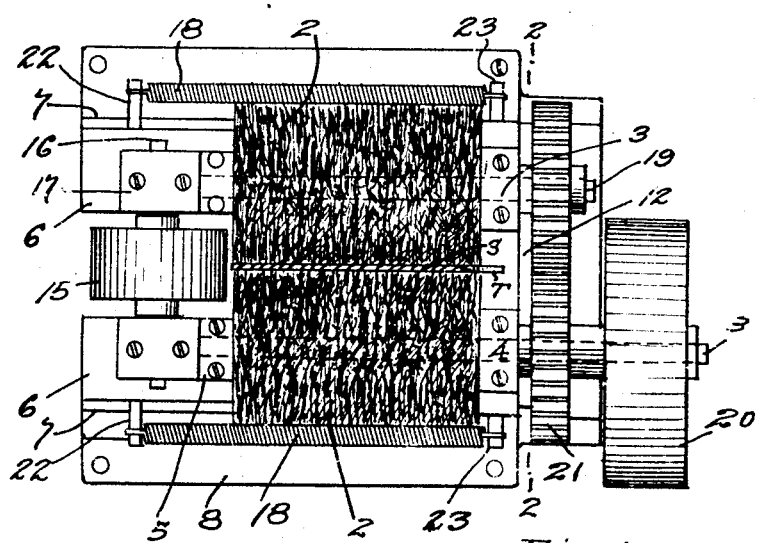
Figure 1 is a plan of the applied, de-pitching apparatus.
Figure 3:
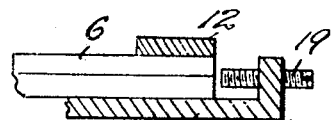
Figure 3 is a detail of a slide stop.
Figure 2:
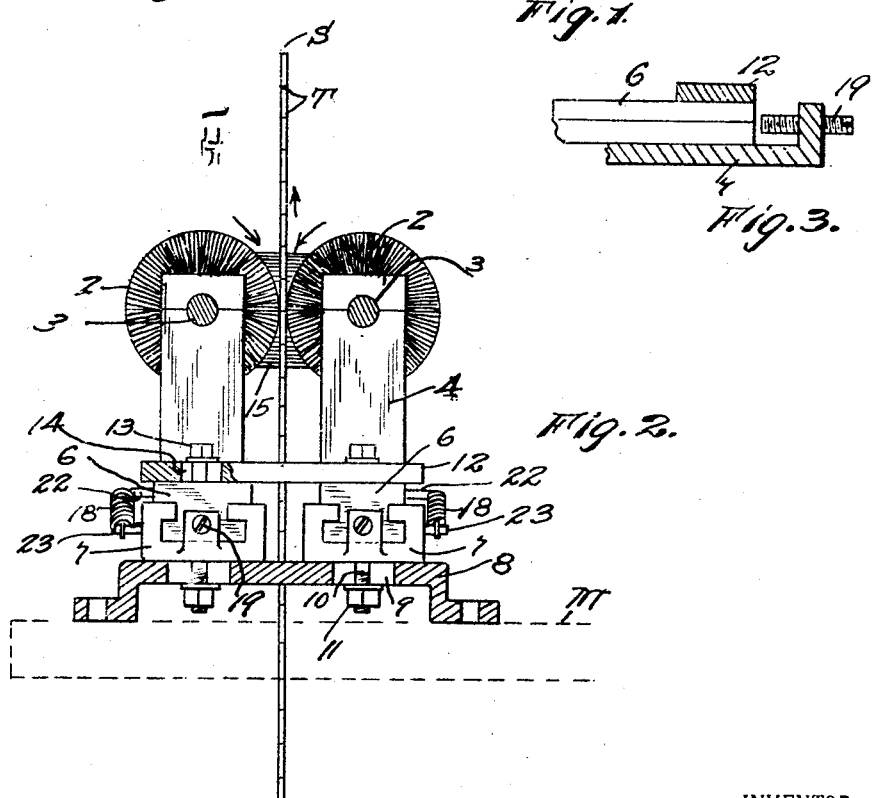
Figure 2 is a cross-section on line 2—2, Fig. 1.

The device is shown as combined with a band saw a fragment of which is indicated at S and which has a toothed edge T. In cutting some lumber it is found that pitch accumulates and hardens on the saw faces and this is very detrimental to rapid, continuous operation.

The purpose of this apparatus is to operate concurrently with and on the two faces of the saw S and keep it cleaned and free of pitch and other foreign matter.

To that end the device includes a pair of stiff strand brush rollers 2—2 built up or fixed on shafts 3 which are set parallel so that contiguous strands of the brush sweep firmly against the adjacent faces of the interposed saw S while the same is running. These shafts are removably mounted, for convenient interchange of brushes 2 according to the width of the saw S. The shafts are mounted in front bearings 4 and rear bearings 5 projecting upward from slides 6 which are longitudinally adjustable in box guides 7.

These guides are adjustably secured to a bed 8 which is adapted to be secured to any convenient machine part M of the band saw so as to position the brushes properly along the saw faces. To provide for adjustment of the rollers 2 toward or from the saw the bed has slots 9 receiving screws 10 projecting down from the boxes 7 and movable in the slots to the desired position after which nuts 11 are set up to clamp the boxes in place. If desired a cross, clamp plate 12 may be secured to the tops of the boxes by screws 13 projecting through slots 14 in the plate 12.

When the rollers or brushes 2 are in proper position they stand back somewhat from the tips of the teeth T so as not to injure these teeth during operation and means are here provided to prevent the brushes from abrading the tips of the teeth T.

Such protective means includes a hard but non-metallic idling roller 15 with shaft 16 mounted in suitable bearings 17 on the rear of the slidable members 6 which are firmly cross connected by the clamp plate 12. This roller is yieldably pulled close to the rear edge of the saw S by springs 18 which are connected to pins 22 on the slides 6 and to pins 23 on the boxes 7 in which the latter operate. Means are provided to limit the position of the roller 15 so that it will normally clear the non-toothed edge of the saw and comprises adjusting screws 19 mounted in the boxes 7 and adjustable to stop the slides 6 so as to hold the roller 15 just clear of the band saw. If the saw happens to surge rearward it will immediately engage the roller 15 and press this back which action will cause the concurrent shift of the brushes 2 so that the toothed edge of the saw cannot shift into path of operation of the brush rollers 2.

One of the roller shafts 3 is provided with a drive pulley 20 and the two shafts are intergeared by gears 21 meshing together so as to cause the brushes to turn preferably at a low rate of speed in a direction, at zone of contact on the saw S, opposite thereto.

It will be seen that the stiff strands of the rotary brushes 2 will effectually sweep off all foreign matter adhering to faces of the saw S.

What is claimed is:

1. In combination with a band saw, means including rotary brushes operative on the faces of the saw and provided with a saw-shifted support, and means for revolving the brushes in a direction opposite to its travel.

2. In combination with a band saw, means including rotary brushes operative on the faces of the saw, and means for revolving the brushes in a direction opposite to its travel, and means to prevent the brushes from engaging the tips of the teeth.

3. A device for de-pitching a running band saw including a pair of brushes arranged to sweep on adjacent faces of and clear of the teeth of the interposed saw and shiftable under saw control, and means for driving the brushes independently of the saw reaction.

4. A device for de-pitching a running band saw including a pair of brushes arranged to sweep on adjacent faces of the interposed saw, and means for driving the brushes independently of the saw reaction and means yieldably holding the brushes in a position clear of the tips of the saw teeth and operative to move with the saw to keep the brushes clear of the teeth when the saw moves edgewise.

5. A saw cleaning device including a pair of brushes set to engage opposite faces of the saw, and a sliding support carrying the brushes, means positioning the brushes at a given point clear of the tips of the teeth, and yieldable means permitting the brushes to recede with the saw to keep clear of the tips of the teeth.

6. A saw cleaning device including a pair of rotary brushes to engage an interposed saw blade at each side, a sliding bearing carrying the brushes, a roller mounted on the sliding bearing to engage the back edge of the saw, and means yieldably holding the roller close to said edge to be engaged thereby if the saw moves theretoward so as to keep the brushes clear of the tips of teeth of the saw.

AUDLEY C. WHITE.